E. L. HAMILTON.
CANDY SANDING MACHINE.
APPLICATION FILED JAN. 27, 1919.
1,315,665.
Patented Sept. 9, 1919.
2 SHEETS—SHEET 1.
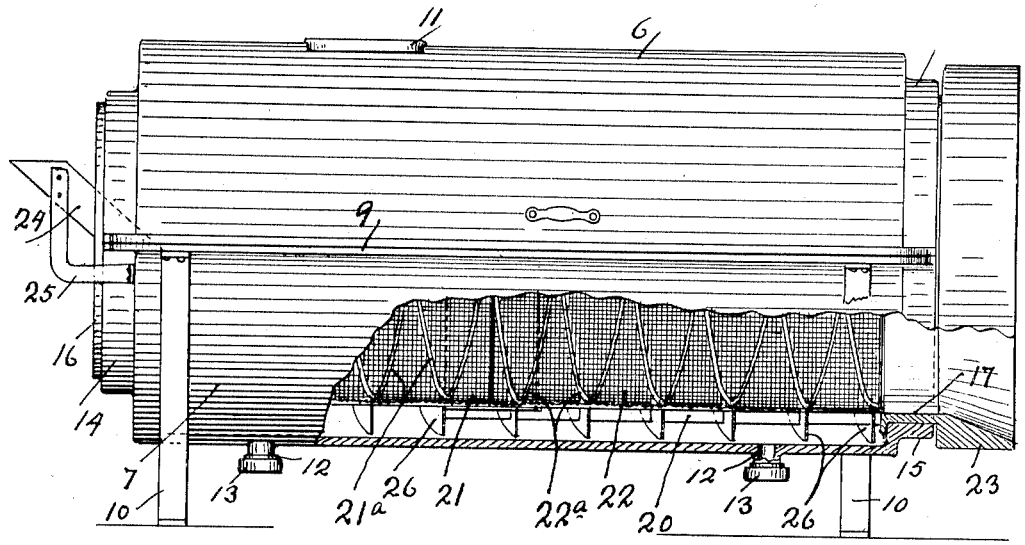
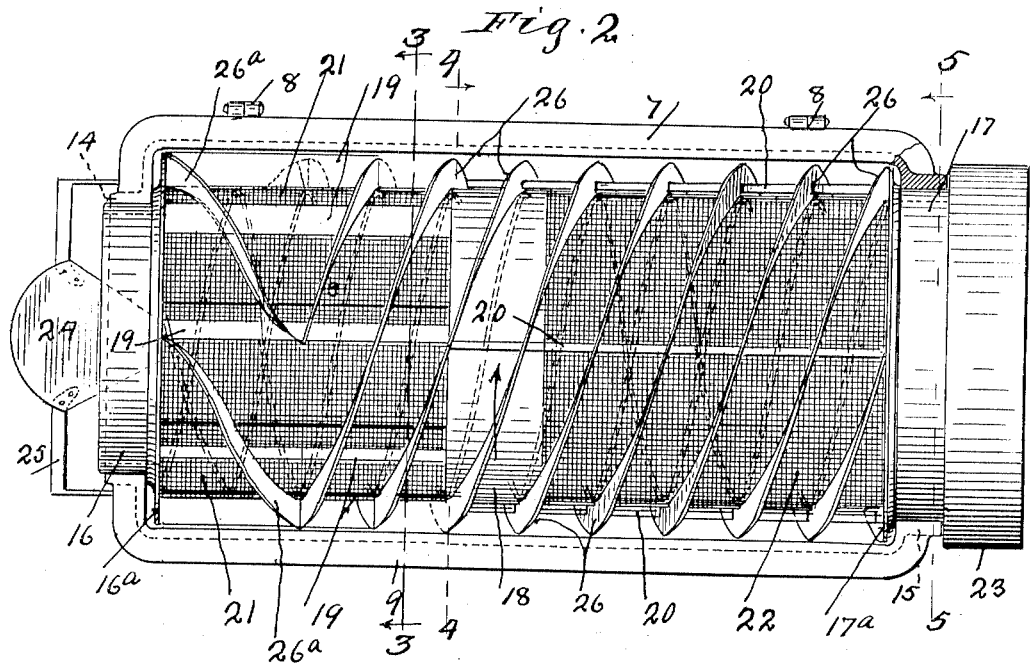
Witnesses.
A. H. Opsahl.
Clara Demarest.
Inventor.
Ernest L. Hamilton
By his Attorneys.
Williamson & Merchant

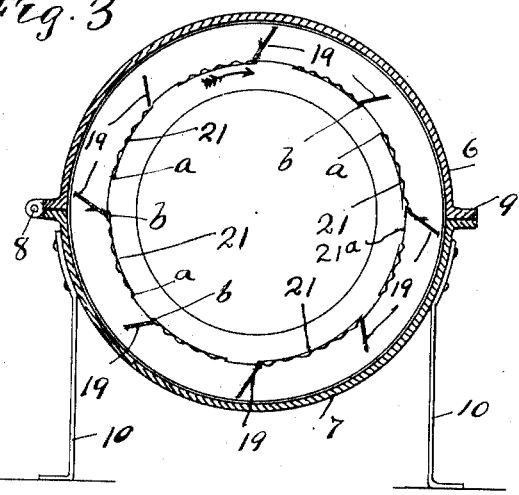
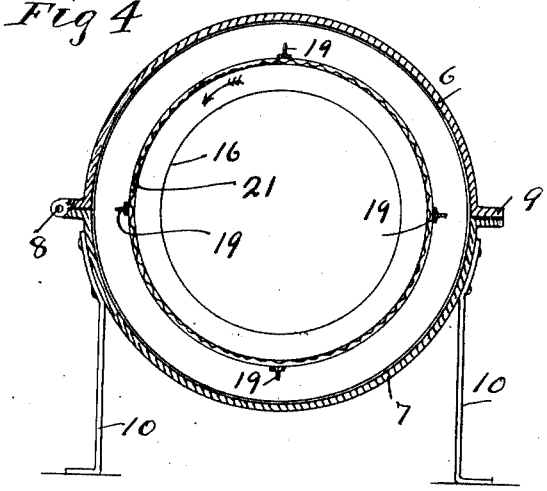
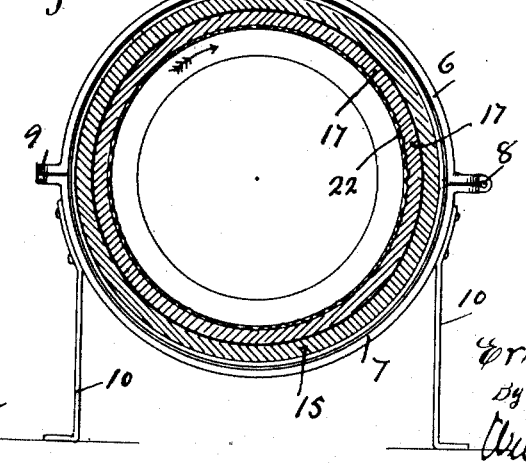

UNITED STATES PATENT OFFICE.

ERNEST L. HAMILTON, OF MINNEAPOLIS, MINNESOTA, ASSIGNOR OF ONE-HALF TO JAMES N. COLLINS, OF MINNEAPOLIS, MINNESOTA.

CANDY-SANDING MACHINE.

1,315,665. Specification of Letters Patent. Patented Sept. 9, 1919.

Application filed January 27, 1919. Serial No. 273,273.

*To all whom it may concern:*

Be it known that I, ERNEST L. HAMILTON, a citizen of the United States, residing at Minneapolis, in the county of Hennepin and State of Minnesota, have invented certain new and useful Improvements in Candy-Sanding Machines; and I do hereby declare the following to be a full, clear, and exact description of the invention, such as will enable others skilled in the art to which it appertains to make and use the same.

My invention relates particularly to what is known as candy sanding machines, but the improved machine is capable of more general use than indicated by this title, and hence, may be designated as a candy coating machine for applying either granular or liquid substances to candy, or the like. Generally stated, the invention consists of the novel devices and combinations of devices hereinafter described and defined in the claims.

The invention, in its present form, is especially designed for use as a candy sanding machine, but capable of more general use, is illustrated in the accompanying drawings wherein like characters indicate like parts throughout the several views.

Referring to the drawings:

Figure 1 is a view chiefly in side elevation, but with some parts in vertical axial section;

Fig. 2 is a plan view of the machine with the top section of the case removed;

Fig. 3 is a section on the line 3—3 of Fig. 2;

Fig. 4 is a section on the line 4—4 of Fig. 2; and

Fig. 5 is a section on the line 5—5 of Fig. 2.

The outer case of the machine is made up of upper and lower approximately semi-cylindrical shells 6 and 7 shown as connected by a hinge bar 8 at one side and at the opposite side having flanges 9 that are adapted to be secured in contact when the case is closed. The lower shell 7 is supported by suitable legs 10 and is the relatively fixed section, while the upper section 6 is adapted to be moved to and from operative position on its hinge 8. On its top, the shell 6 is provided with an opening 11 through which the sugar or coating material may be inserted from time to time.

When a liquid, such, for example, as syrup, is to be used as a coating material, it may be desirable to feed the same upward through the bottom of the lower shell 7 from a suitable pan or other device not shown; and for this purpose, the said shell 7, in its bottom, is shown as provided with depending nipples 12 adapted to be closed by caps 13 when the nipples are not used.

At their front ends, the shells 6 and 7 are provided with semi-circular collars 14, and at their rear ends with similar collars 15, which collars afford large internal sleeve-like bearings in the end portions of an interior rotary cylindrical screen or reticulate drum of novel construction. This rotary drum is preferably constructed as follows:

A large annular bearing sleeve 16 is rotatively mounted in the divided sleeve 14, and a similar rotary bearing sleeve 17 is mounted in the divided sleeve 15. These rotary sleeves 16 and 17, at their inner ends, respectively, are provided with outstanding annular flanges 16ª and 17ª. At the central portion of the drum is an imperforate annular band or zone section 18 that is rigidly connected to the flange 16ª of the sleeve 16 by longitudinally extended circumferentially spaced lifting flights 19. In a similar manner, the imperforate band 18 is rigidly connected to the flange 17ª of the rotary sleeve 17, by longitudinally extended circumferentially spaced bars 20 shown as in the form of small T-irons. A cylindrical screen 21 is located just inside of the band 18, sleeve 16 and lifting flights 19 and is preferably rigidly and permanently secured thereto. Another cylindrical screen 22 fits closely but removably within the said band 18, sleeve 17 and bars 20, and is adapted to be applied and removed through the said sleeve 17. It may be frictionally, or otherwise, held in working position shown, but may be easily removed at will. In fact, I employ several screens 22 varying in mesh, and these may be interchangeably used, as required for different kinds of work. The said screens 22 are of the utmost importance, but the screen 21 might, in some instances be entirely dispensed with. Preferably, however, it is employed but is cut away or left open between points marked *a—b* on Fig. 3, so that the material lifted by the flights 19 will be discharged into the sieve 21. The direction of rotation of the drum is indicated by the arrows marked on Figs. 2 and 3.

To the outer end of sleeve 17, an annular pulley 23 is secured and a power driven belt, not shown, will be run over this pulley. The candy to be coated is delivered, either from a hopper or from another machine or any suitable source, onto an oblique feed spout 24 which directs the candy into the receiving end of the drum. This spout 24, as shown, is supported from the lower shell 7 of the casing by a suitable bracket 25.

A spiral feed blade 26, which has a left hand tread, surrounds the removable cylindrical screen 22 and is secured to the flange 17$^a$, to the tie bars 20, to the band 18 and at their front ends, also to the lifting flights 19. The front ends of the said left hand spiral blades 26 terminate at about midway between the band 18 and flange 16$^a$, and from such point they are provided with reversed or right hand spiral blade extensions 26$^a$ that are secured to the flights 19 and to the flange 16$^a$, and operate as hereinafter described.

Located just within the drum is a spiral feed screw 21$^a$—22$^a$ shown as made from a wire rod bent into spiral form. The two sections 21$^a$ and 22$^a$ are separable, the said section 21$^a$ being secured to the interior of the screen 21 and the section 22$^a$ being secured to the interior of the screen 22.

Operation.

The operation of the machine may be briefly described as follows:

It will be assumed that the proper amount of pulverized sugar has been placed within the drum and casing and that the candy is fed into the receiving or front end of the drum from the spout 24. Under rotation of the drum and casing, and that the candy is fed into the receiving or front end of the drum from the spout 24. Under rotation of the drum, the candy will, by the screw 21$^a$—22$^a$ be gradually worked toward the right or discharge end of the machine but will be rolled over and over with a tendency to move upward with the rotating side of the drum. The powder or pulverized sugar will be continuously lifted up by the flights 19 and discharged back into the interior of the screen 21 where it will be recommingled with the candy and caused to thoroughly coat the same, but of course, the powder or sugar will be also fed rearward by the screw 21$^a$—22$^a$ and will fall through the meshes of the screen to the bottom of the casing or shell, but the feed screw 26 will continuously feed the said powder or sugar back to the front end of the casing until the right hand blades 26$^a$ come into action thereon, whereupon its forward motion will be stopped and it will be crowded forward until it passes through the openings $a$ and $b$ into the interior of the screen 21. In this way, the powder or pulverized sugar will be worked over and over and thoroughly applied to the candy, and the candy, after having been thoroughly powdered but free from surplus powder, will be discharged at the rear of the machine outward through the openings in the sleeve 17 and pulley 23.

The imperforate annular section 18 will support a considerable mass of powder which will not be able to pass therethrough, but through which the candy must pass on its way through the drum. This imperforate section therefore insures a more-or-less thorough powdering or coating action.

The action in applying syrup to candy will be very much like the action in applying powder. In fact, in practice, I intend to use several of these machines, one for applying syrup, and the other for applying sugar or powder, and it will, of course, be understood that the candy should be coated with syrup and thereby made sticky before it is powdered. Several of these machines may therefore be coupled up for a battery, the one arranged to deliver to the other, so that the complete operation of sanding or applying powder or other coating to the candy may be automatically carried on as a continuous operation. The efficiency of this machine for the purposes stated, has been demonstrated in practice.

What I claim is:

1. A machine of the kind described comprising a casing and an approximately horizontal rotary drum working within said casing and having cylindrical reticulate portions, means for directing the candy through said drum, and a spiral conveyer on the exterior of said drum arranged to act on the powder supported by the bottom of said casing and operating under rotation of the drum to return the same from the delivery toward the receiving end of said drum.

2. A machine of the kind described comprising a casing and an approximately horizontal rotary drum working within said casing and having cylindrical reticulate portions, means for directing the candy through said drum, and a spiral conveyer on the exterior of said drum arranged to act on the powder supported by the bottom of said casing and operating under rotation of the drum to return the same from the delivery toward the receiving end of said drum, and relatively short reversely acting spiral blades on the exterior of the receiving end of said drum.

3. In a machine of the kind described, the combination with a casing, of a drum rotatively mounted therein and through which the candy may be fed, said drum having an axially removable and replaceable cylindrical screen section at its delivery end, and flights carried by the receiving end portion of said drum for lifting and precipitating the flour and candy under rotation of the drum.

4. In a machine of the kind described, the combination with a casing, of a drum rotatively mounted therein and through which the candy may be fed, said drum having an axially removable and replaceable cylindrical screen section at its delivery end, and flights carried by the receiving end portion of said drum for lifting and precipitating the flour and candy under rotation of the drum, the said drum having an imperforate cylindrical intermediate section and a surrounding return action feed screw.

5. In a machine of the kind described, the combination with a casing, of a drum having sleeve-like heads rotatively mounted in said casing, said drum comprising longitudinal circumferentially spaced tie members and surrounding return action feed screw, and a cylindrical screen insertible and removable through the rear head of said drum and from a position in which it is telescoped within the rear portion of said feed screw.

6. In a machine of the kind described, the combination with a casing, of a rotary drum working within said casing and comprising sleeve-like heads rotatively mounted in the ends of said casing, an imperforate intermediate section, longitudinal lifting flights rigidly connecting the front drum head to the intermediate portion thereof, longitudinal bars rigidly connecting the rear drum head to the intermediate portion of said drum, a return action feed screw extending from the rear drum head to points forward of the intermediate section of said drum, reverse action feed blades on the exterior of the front portion of said drum, and a cylindrical screen extended within said return action feed blade from the rear drum head to the intermediate section thereof.

7. In a machine of the kind described, the combination with a casing, of a rotary drum working within said casing and comprising sleeve-like heads rotatively mounted in the ends of said casing, an imperforate intermediate section, longitudinal lifting flights rigidly connecting the front drum head to the intermediate portion thereof, longitudinal bars rigidly connecting the rear drum head to the intermediate portion of said drum, a return action feed screw extending from the rear drum head to points forward of the intermediate section of said drum, reverse action feed blades on the exterior of the front portion of said drum, and a cylindrical screen extended within said return action feed blade from the rear drum head to the intermediate section thereof, the said screen being axially removable and replaceable by axial movement through the rear head of said drum.

8. In a machine of the kind described, the combination with a casing, of a rotary drum working within said casing and comprising sleeve-like heads rotatively mounted in the ends of said casing, an imperforate intermediate section, longitudinal lifting flights rigidly connecting the front drum head to the intermediate portion thereof, longitudinal bars rigidly connecting the rear drum head to the intermediate portion of said drum, a return action feed screw extending from the rear drum head to points forward of the intermediate section of said drum, reverse action feed blades on the exterior of the front portion of said drum, and a cylindrical screen extended within said return action feed blade from the rear drum head to the intermediate section thereof, and a forward acting feed screw on the interior of said drum.

9. In a machine of the kind described, the combination with a casing, of a rotary drum working within said casing and comprising sleeve-like heads rotatively mounted in the ends of said casing, an imperforate intermediate section, longitudinal lifting flights rigidly connecting the front drum head to the intermediate portion thereof, longitudinal bars rigidly connecting the rear drum head to the intermediate portion of said drum, a return action feed screw extending from the rear drum head to points forward of the intermediate section of said drum, reverse action feed blades on the exterior of the front portion of said drum, and a cylindrical screen extended within said return action feed blade from the rear drum head to the intermediate section thereof, the said screen being axially removable and replaceable by axial movement through the rear head of said drum, the said cylindrical screen being axially replaceable by axial movement through the rear drum head, and a forward action feed spiral within said drum made in two sections, one section thereof being secured to the interior of said removable screen and the other section thereof being secured to the interiors of said separated cylindrical screen sections.

In testimony whereof I affix my signature in presence of two witnesses.

ERNEST L. HAMILTON.

Witnesses:
CLARA DEMAREST,
BERNICE G. BAUMANN.